(12) United States Patent
Rostamzadeh et al.

(10) Patent No.: US 9,343,900 B2
(45) Date of Patent: May 17, 2016

(54) PASSIVE NETWORK FOR ELECTROSTATIC PROTECTION OF INTEGRATED CIRCUITS

(75) Inventors: Cyrous F. Rostamzadeh, Bloomfield Hills, MI (US); Paul Janos, West Bloomfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 1836 days.

(21) Appl. No.: 12/490,466

(22) Filed: Jun. 24, 2009

(65) Prior Publication Data

US 2010/0020455 A1 Jan. 28, 2010

Related U.S. Application Data

(60) Provisional application No. 61/083,369, filed on Jul. 24, 2008.

(51) Int. Cl.
*H02H 9/00* (2006.01)
*H02H 9/04* (2006.01)

(52) U.S. Cl.
CPC .................... *H02H 9/046* (2013.01)

(58) Field of Classification Search
CPC ..................................... H02H 9/046
USPC ................................... 361/56, 111
See application file for complete search history.

(56) References Cited

U.S. PATENT DOCUMENTS

| | | | |
|---|---|---|---|
| 3,600,632 A * | 8/1971 | Bright et al. ............ | 361/218 |
| 4,726,991 A * | 2/1988 | Hyatt et al. ............ | 428/329 |
| 5,301,084 A | 4/1994 | Miller | |
| 5,561,577 A | 10/1996 | Motley | |
| 5,708,549 A | 1/1998 | Croft | |
| 6,025,746 A | 2/2000 | So | |
| 6,028,465 A | 2/2000 | So | |
| 6,775,112 B1 | 8/2004 | Smith et al. | |
| 6,987,654 B2 | 1/2006 | Levinzon | |
| 7,023,678 B2 | 4/2006 | Ker et al. | |
| 7,067,914 B2 | 6/2006 | Malinowski et al. | |
| 7,115,952 B2 | 10/2006 | Woo et al. | |
| 7,151,298 B1 * | 12/2006 | Eggert et al. ............ | 257/355 |
| 7,218,491 B2 | 5/2007 | Jaussi et al. | |
| 7,335,955 B2 | 2/2008 | Mitra et al. | |

(Continued)

OTHER PUBLICATIONS

Rostamzadeh, Cyrous, et al., "Electrostatic Discharge Analysis of Multi Layer Ceramic Capacitors", IEEE, pp. 35-40, 2009.

(Continued)

*Primary Examiner* — Thienvu Tran
*Assistant Examiner* — Tien Mai
(74) *Attorney, Agent, or Firm* — Michael Best & Friedrich LLP

(57) ABSTRACT

Embodiments of the invention provide an electrostatic discharge protection device or network for an integrated circuit. The network includes a first circuit branch and a second circuit branch connected in a parallel configuration. The first branch has a first inductance, a first resistance, and includes a first capacitive component. The second branch has a second inductance, a second resistance, and includes a second capacitive component. A first end of the first circuit branch and a first end of the second circuit branch are coupled to a first node, and a second end of the first circuit branch and a second end of the second circuit branch are coupled to zero-voltage reference level. The network is capable of providing a low impedance path away from a terminal of the integrated circuit during an electrostatic discharge event.

20 Claims, 11 Drawing Sheets

(56) References Cited

U.S. PATENT DOCUMENTS

| | | | |
|---|---|---|---|
| 7,675,192 B2* | 3/2010 | Tang et al. | 307/10.1 |
| 7,679,878 B2* | 3/2010 | Maggiolino | 361/119 |

OTHER PUBLICATIONS

Boynton, Tom, "General Motors Computerized Vehicle Control Systems: a Short History", 21 pages, CET 249, Dec. 2006.

IEC—Publication, IEC 61000-4-2 {Ed.2.0}, "Electromagnetic Compatibility (EMC)—Part 4-2: Testing and Measurement Techniques—Electrostatic Discharge Immunity Test", available online at: <http://www.iec.ch/cgi-bin/procgi.pl/www/iecwww.p?wwwlang=e&wwwprog=cat-det.p&progdb=db1&wartnum=042407>, Oct. 13, 2009.

Littelfuse, "Transient Suppression Devices and Principles", Application Note 9768, Jan. 1998.

Wikipedia, "Transient Voltage Suppressor", available online at: <http://en.wikipedia.org/wiki/Transient_voltage_suppressor>, Sep. 8, 2009.

Wikipedia, "Varistor", available online at: <http://en.wikipedia.org/wiki/Varistor>, Oct. 8, 2009.

Wikipedia, "Electrostatic Discharge", available online at: <http://en.wikipedia.org/wiki/Electrostatic_discharge>, Jul. 12, 2008.

Electrostatic Discharge Association, "Fundamentals of ESD. Part Five—Device Sensitivity and Testing", available online at: <http://www.esda.org/basics/part5.cfm>, ESD Association, Rome, NY, 2001.

Electronic Specifier, "Multilayer Ceramic Transient Voltage Suppressors Target ESD Protection for CMOS, Bipolar and SiGe Devices", News Release from: AVX, available online at: <http://www.electronicspecifier.com/Circuit-Protection/Multilayer-ceramic-transient-voltage-suppressors-target-ESD-protection-for-CMOS-Bipolar-and-SiGe-devices.asp>, Feb. 14, 2008.

* cited by examiner

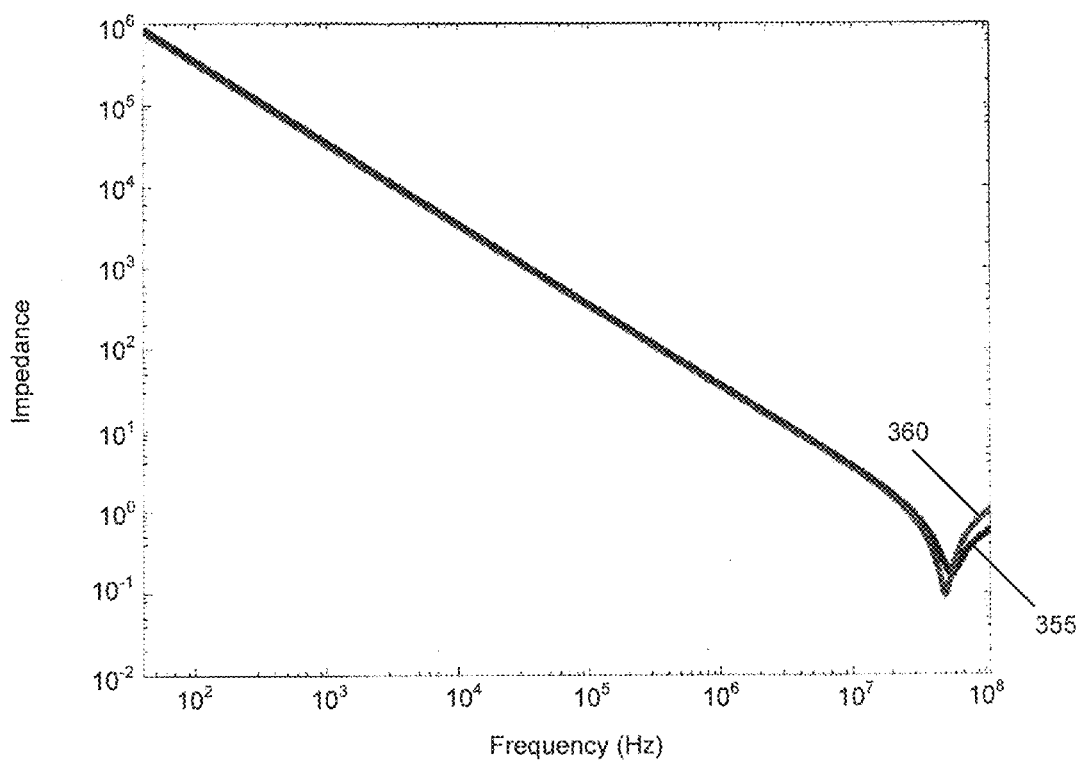

PASSIVE NETWORK FOR ELECTROSTATIC PROTECTION OF INTEGRATED CIRCUITS

RELATED APPLICATIONS

This application claims the benefit of prior filed U.S. provisional patent application Ser. No. 61/083,369, filed on Jul. 24, 2008, the entire contents of which are hereby incorporated by reference.

BACKGROUND

The present invention relates to electrostatic discharge ("ESD") protection devices. More particularly, the invention relates to ESD protection devices for integrated circuits.

Integrated circuits ("ICs") can be damaged by large, high-frequency currents produced during an ESD event. ESD events are caused by a variety of sources. For example, a packaged IC can acquire a charge when being held by a person whose body is electrostatically charged. An ESD event occurs when the person inserts the IC into a socket and one or more of the IC's pins contact the grounded terminals of the socket. This type of event is known as a human body model ("HBM") ESD event. A second ESD event, known as a machine model ("MM") ESD event, is caused by contact with metallic objects. A third ESD event is a charged device model ("CDM") ESD event.

ESD protection circuits are often added externally to IC chips to reduce damage caused by ESD events. Many conventional ESD protection schemes for ICs employ peripheral dedicated circuits to carry the ESD currents from a pin or pad of a device to ground by providing a lower impedance path. The direction that current from an ESD event flows depends on the polarity of an ESD strike (e.g., positive or negative). The polarity of the ESD strike is determined from the polarity of the voltage on an IC pin relative to a ground or a supply voltage terminal. In both positive and negative ESD events, current may flow through circuitry within the IC that is vulnerable to large currents.

SUMMARY

Automotive components are particularly susceptible to damage from ESD events, particularly in low humidity conditions (e.g., during the winter). In low humidity conditions, the human body is capable of accumulating a static charge of up to, for example, 25 kV. Drivers and passengers can cause an ESD event when they touch components of the vehicle because the vehicle is at a lower potential than the driver and passengers.

Conventional ESD protection techniques are either inadequate or require the use of expensive components such as a transient voltage suppressor ("TVS"), a metal oxide varistor ("MOV"), or diodes. Therefore, there is a need for improved, less-expensive ESD protection circuits. External ESD protection circuits require low impedance for proper ESD protection such that the ESD currents flow through the protection circuitry rather than through the more vulnerable circuits in an IC. The ESD protection circuitry must also be capable of withstanding the large, high-frequency currents produced during an ESD event. The large, high-frequency currents of an ESD event can cause dielectric breakdown in capacitors which may result in the reduced impedance of a capacitor. Reduced capacitor impedance from DC (0 Hz) to the 100 kHz frequency range can result in excessive current leakage through the ESD protection circuitry. Larger value capacitors (e.g., >10 nF) are, generally, less susceptible to the reduced impedance, but are not a reasonable option as they can degrade the quality of I/O signals.

In one embodiment, the invention provides an ESD protection device for an automotive electronic control unit ("ECU"), microcontroller, or application specific integrated circuit ("ASIC"). The ESD device includes an ESD protection circuit or network coupled between an I/O terminal of the ECU and a terminal of a power supply voltage (e.g., a 13.5V automotive power supply voltage). The network reduces the impedance of an ESD current path from the I/O terminal to the terminal of the power supply voltage (e.g., a zero-voltage reference level) to divert current away from the ECU during an ESD event.

In another embodiment, the invention provides a network for protecting an integrated circuit including at least one terminal from electrostatic discharge. The network includes a first circuit branch, a second circuit branch, a third circuit branch, and a fourth circuit branch. The first circuit branch has a first inductance, a first resistance, and includes a first capacitive component. The second circuit branch has a second inductance, a second resistance, and includes a second capacitive component. The third circuit branch has a third inductance, and the fourth circuit branch has a fourth inductance. A first end of the first circuit branch and a first end of the second circuit branch are connected to a first node, and a first end of the third circuit branch and a first end of the fourth circuit branch are connected to the first node. The network provides a low impedance path away from the at least one terminal of the integrated circuit during an electrostatic discharge event.

In another embodiment, the invention provides a passive electrical network for the electrostatic protection of an integrated circuit that includes at least one terminal. The network includes a first circuit branch having a first reactance. The first circuit branch is positioned between a first node and a second node. The network also includes a second circuit branch having a second reactance, and the second circuit branch is positioned between the second node and a third node. Finally, the network includes a third circuit branch including a first reactive circuit component positioned between the second node and a fourth node. The fourth node is connected to a terminal of an automobile power supply, and the third node is connected to the at least one terminal of the integrated circuit.

In yet another embodiment, the invention provides a method of protecting an integrated circuit that includes at least one terminal from an electrostatic discharge event. The method includes connecting, in a first circuit branch having a first resistance and a first inductance, a first capacitive component, and connecting, in a second circuit branch having a second inductance, a second resistance and a second capacitive component. A first end of the first branch and a first end of the second branch are connected to a first node. The method also includes connecting a first end of a third circuit branch having a third inductance to the first node, and connecting a first end of a fourth circuit branch having a fourth inductance to the first node. A second end of the fourth circuit branch is connected to the at least one terminal of the integrated circuit, and the first circuit branch and the second circuit branch provide a low impedance path away from the at least one terminal of the integrated circuit during the electrostatic discharge event.

Other aspects of the invention will become apparent by consideration of the detailed description and accompanying drawings.

BRIEF DESCRIPTION OF THE DRAWINGS

FIG. 11 is a diagram of an impedance-frequency response for the ESD protection network of FIG. 9 before and after an ESD event.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
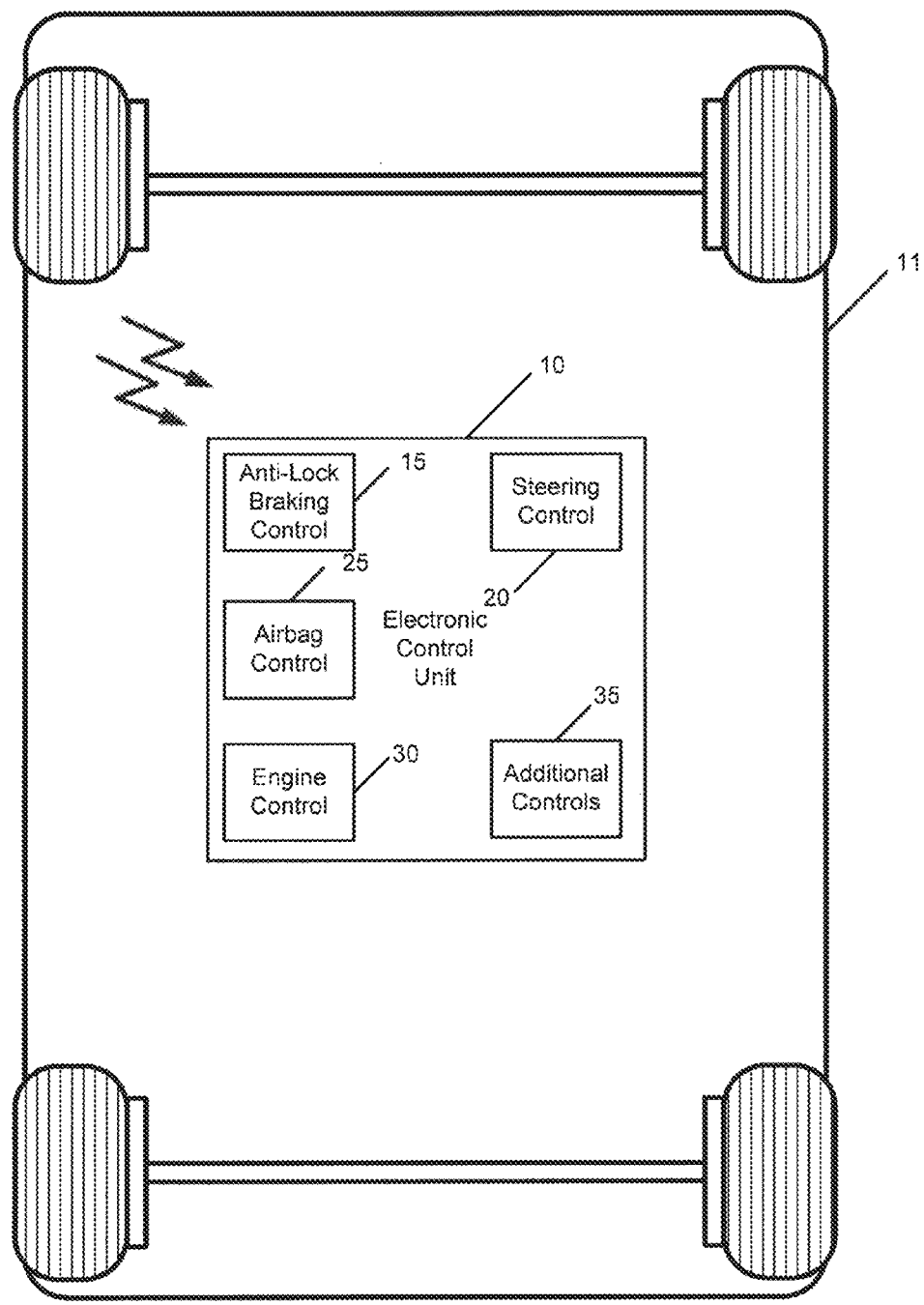
FIG. 1 illustrates an electronic control unit ("ECU") for a vehicle.

FIG. 1 illustrates an electronic control unit ("ECU") 10 for a vehicle 11. The ECU 10 is embedded in the vehicle 11 and is, in the embodiment shown, a single unit incorporating a plurality of vehicle control subsystems, such as, for example, an anti-lock braking control subsystem 15, a steering control subsystem 20, an airbag control subsystem 25, an engine control subsystem 30, and additional control subsystems 35. In other embodiments, each control subsystem includes a corresponding ECU. The control systems of the ECU 10 are important to the safe operation of the vehicle 11. As a result, protection against an electrostatic discharge ("ESD") 40 is necessary to prevent damage to subsystems within the ECU 10 or the ECU 10 itself.

Figure 2:
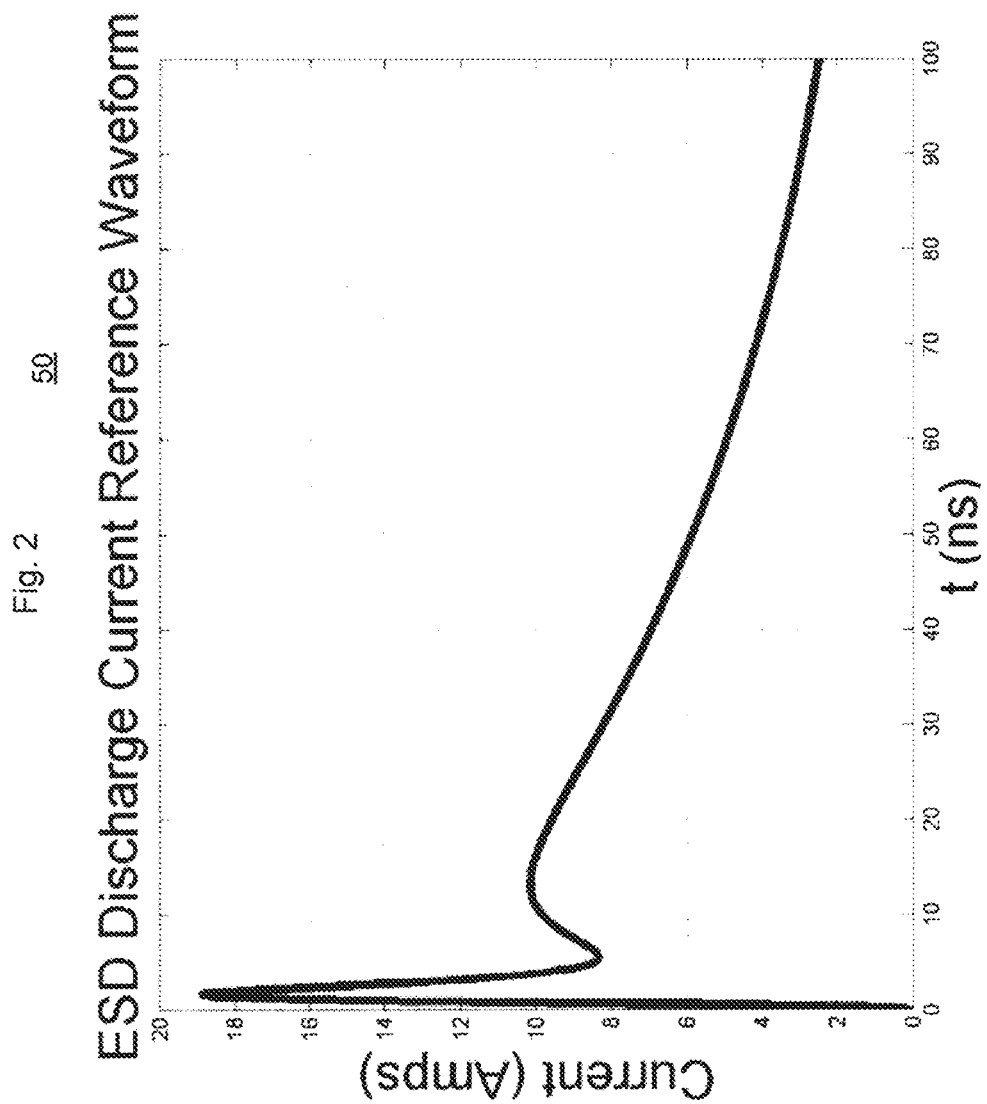
FIG. 2 is a diagram of an electrostatic discharge ("ESD") current reference waveform.

The International Electrotechnical Commission ("IEC") outlines the standards for ESD protection. The standards for testing and measurement of ESD immunity are outlined in the IEC 61000-4-2 standards. An ESD discharge current reference waveform 50 which an electronic device must be able to withstand, as outlined in the IEC 61000-4-2 standards, is illustrated in FIG. 2. The reference waveform 50 includes a maximum amplitude of approximately 19 A and includes significant high frequency signal components (not illustrated). ESD protection circuitry must be able to protect the ECU 10 against high ESD event currents without being effected by the high frequency signal components.

Figure 3:
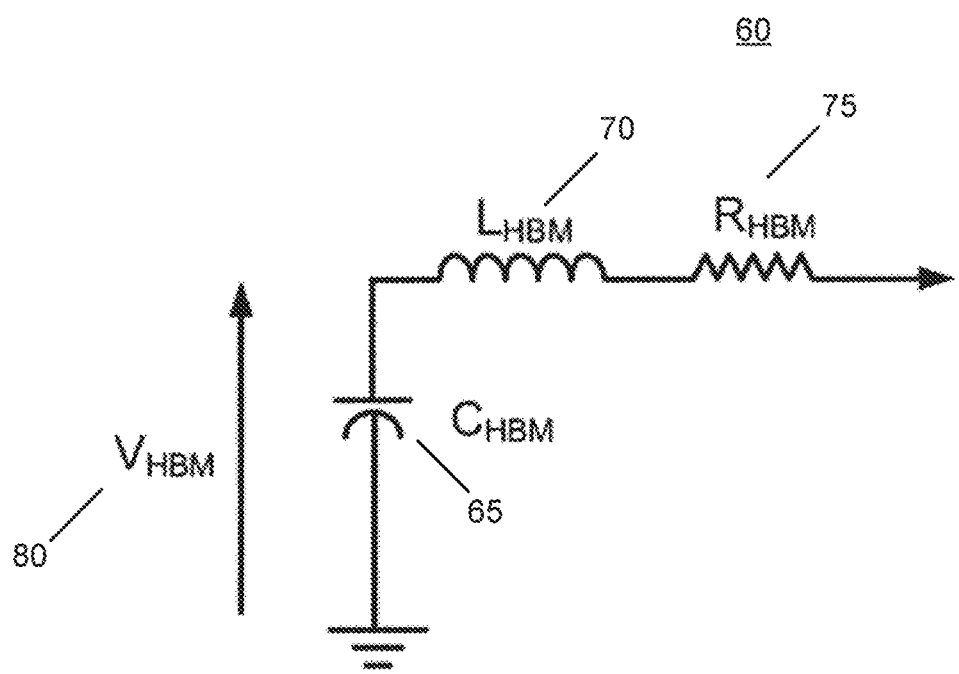
FIG. 3 is a diagram of an equivalent circuit for a human body model ("HBM") ESD event.

The most common type of ESD event is known as a human body model ("HBM") ESD event. FIG. 3 illustrates an equivalent circuit model 60 for an HBM ESD charge or event. The HBM charge is modeled as a capacitive component ("$C_{HBM}$") 65 in series with an inductive component ("$L_{HBM}$") 70 and a resistive component ("$R_{HBM}$") 75. In many instances, the static voltage ("$V_{HBM}$") 80 that is accumulated during an HBM charge is in excess of ±25 kV. The capacitive component 65 of the HBM model 60 is estimated between 50 and 250 pF, the inductive component 70 is estimated as less than 0.1 µH, and the resistive component 75 is estimated between 500'Ω and 10 k'Ω. In other embodiments, different ESD models can be used.

Figure 4:
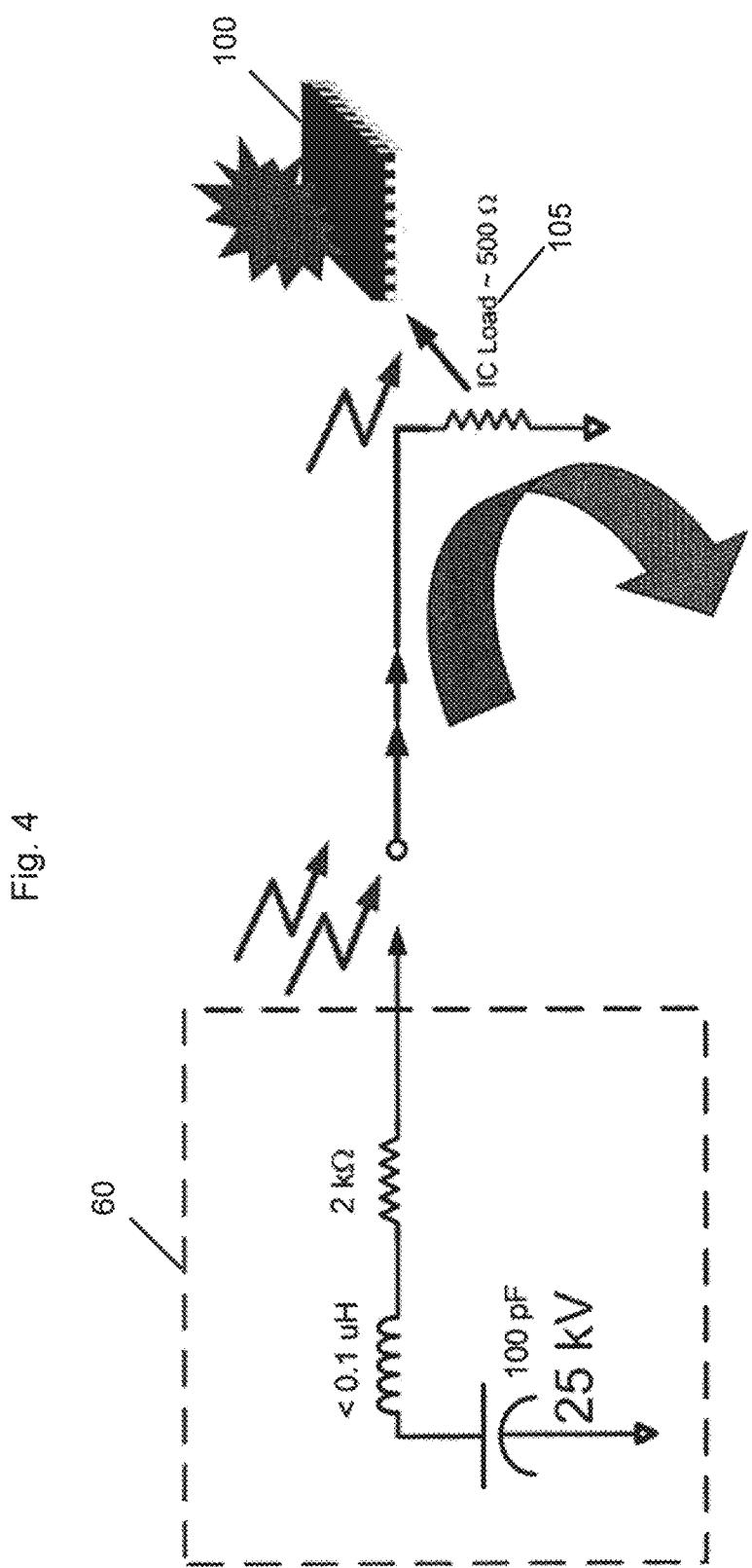
FIG. 4 illustrates an unprotected integrated circuit ("IC") exposed to an HBM ESD event.

FIG. 4 illustrates a 25 kV ESD event 60 according to the HBM model of FIG. 3. The ESD event 60 is striking an unprotected integrated circuit ("IC") 100. The equivalent load resistance 105 of the IC 100 is approximately 500'Ω. The IC 100 illustrated in FIG. 4, like most ICs, is not designed to withstand a large current and is, therefore, susceptible to permanent damage from the ESD event 60. The current generated by the ESD event 60 and flowing through the IC 100 (according to Ohm's Law) is given below:

$$I = \frac{V}{R} = \frac{25000 \text{ V}}{500 \text{ }\Omega} = 50 \text{ A}$$

A 50 A current flowing through the IC 100 is, in most instances, large enough to cause catastrophic failure of the IC 100.

Figure 5:
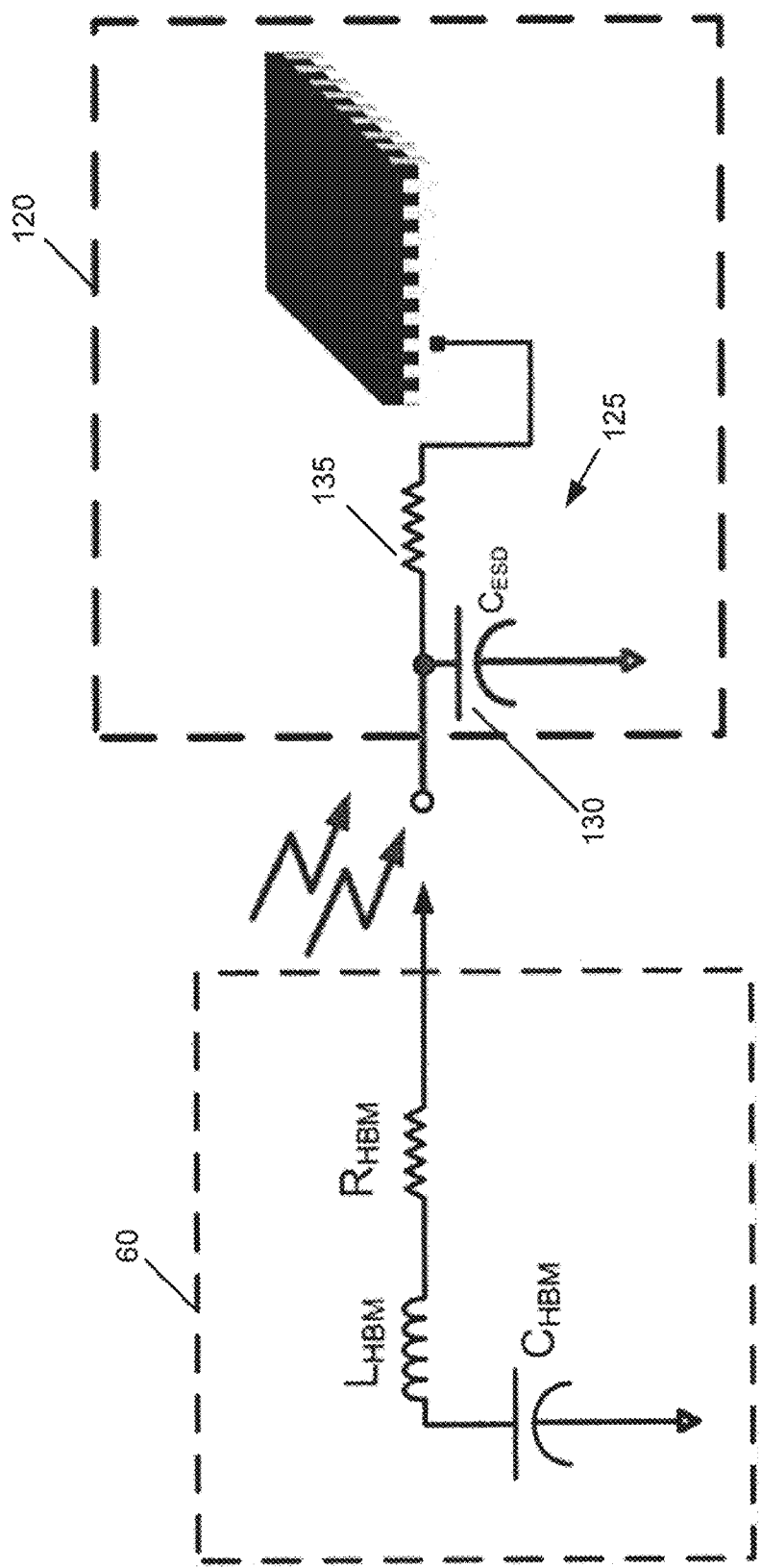
FIG. 5 illustrates a conventionally protected IC exposed to an HBM ESD event.

FIG. 5 illustrates an ECU 120 that includes a conventional ESD protection network 125. The ECU 120 is subjected to an HBM ESD event 60 as described above with respect to FIGS. 3 and 4. The conventional ESD protection network 125 consists of a capacitive component $C_{ESD}$ 130 connected from a terminal line of the ECU 120 to ground and a resistance 135 coupled to a pin or terminal of an IC within the ECU 120. The conventional ESD protection network 125 provides some protection for the ECU 120 against a single HBM ESD event 60. However, the capacitor 130 experiences dielectric breakdown due to the large ESD current and is, in many instances, destroyed or permanently damaged by the ESD event 60. As such, the conventional ESD protection network 125 is unable to protect the IC terminal that is connected to the damaged ESD protection circuit against any additional ESD events.

Figure 6:
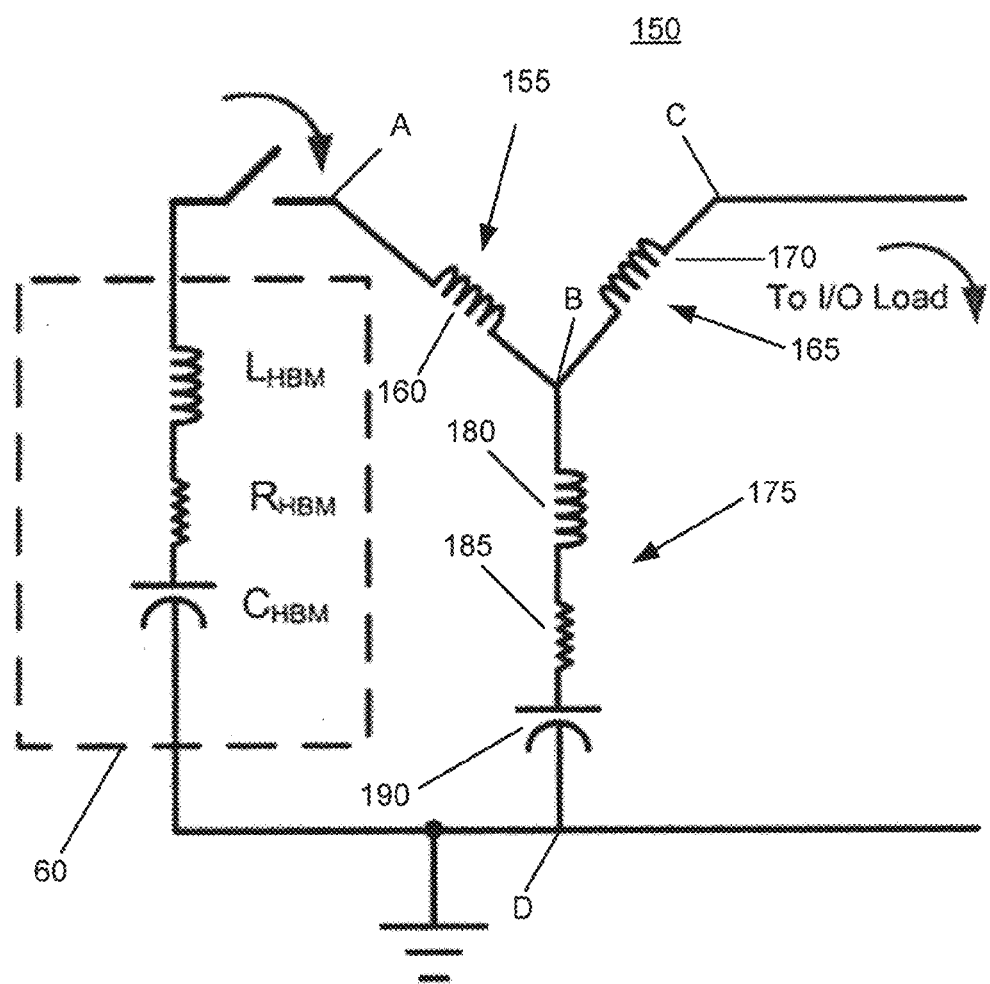
FIG. 6 is a diagram of a Y-connected passive ESD protection network according to an embodiment of the invention.

FIG. 6 illustrates an optimized ESD protection network 150. The network 150 includes nodes A, B, C, and D. A first circuit branch 155 between nodes A and B has a first reactance or inductance 160, and a second circuit branch 165 between nodes B and C has a second inductance 170. The first inductance 160 and the second inductance 170 have approximate values of, for example, 3 nH. A third circuit branch 175 has a third inductance 180 and a first resistance 185. The third circuit branch 175 also includes a first capacitive circuit component 190 with a value of, for example, 10 nF. The first resistance 185 is shown as a parasitic equivalent resistance or resistive circuit component and has a value of approximately 100 m'Ω. The third inductance 180 is shown as a parasitic equivalent inductance or inductive circuit component and has a value of approximately 800 pH. The ESD protection network 150 forms a Y-connection with the first circuit branch 155, the second circuit branch 165, and the third circuit branch 175. For example, one end of the first circuit branch 155, one end of the second circuit branch 165, and one end of the third circuit branch 175 are connected at node B. The advantages of the Y-connection among nodes A, B, and C are described in greater detail below.

An ESD event includes significant high frequency signals (e.g., in the gigahertz frequency range). The presence of high frequency signals on the terminal lines of the ECU requires a minimization of line interconnect inductances. With high frequency signals, the line interconnect inductances are capable of affecting the operation of the ESD protection network and the IC. The Y-connection to the passive ESD protection network 150 illustrated in FIG. 6 optimizes the design of the ESD protection network 150. The component mounting strategy for a printed circuit board ("PCB") utilizing the Y-connection minimizes the PCB interconnect inductance for the ESD protection network 150.

Figure 7:
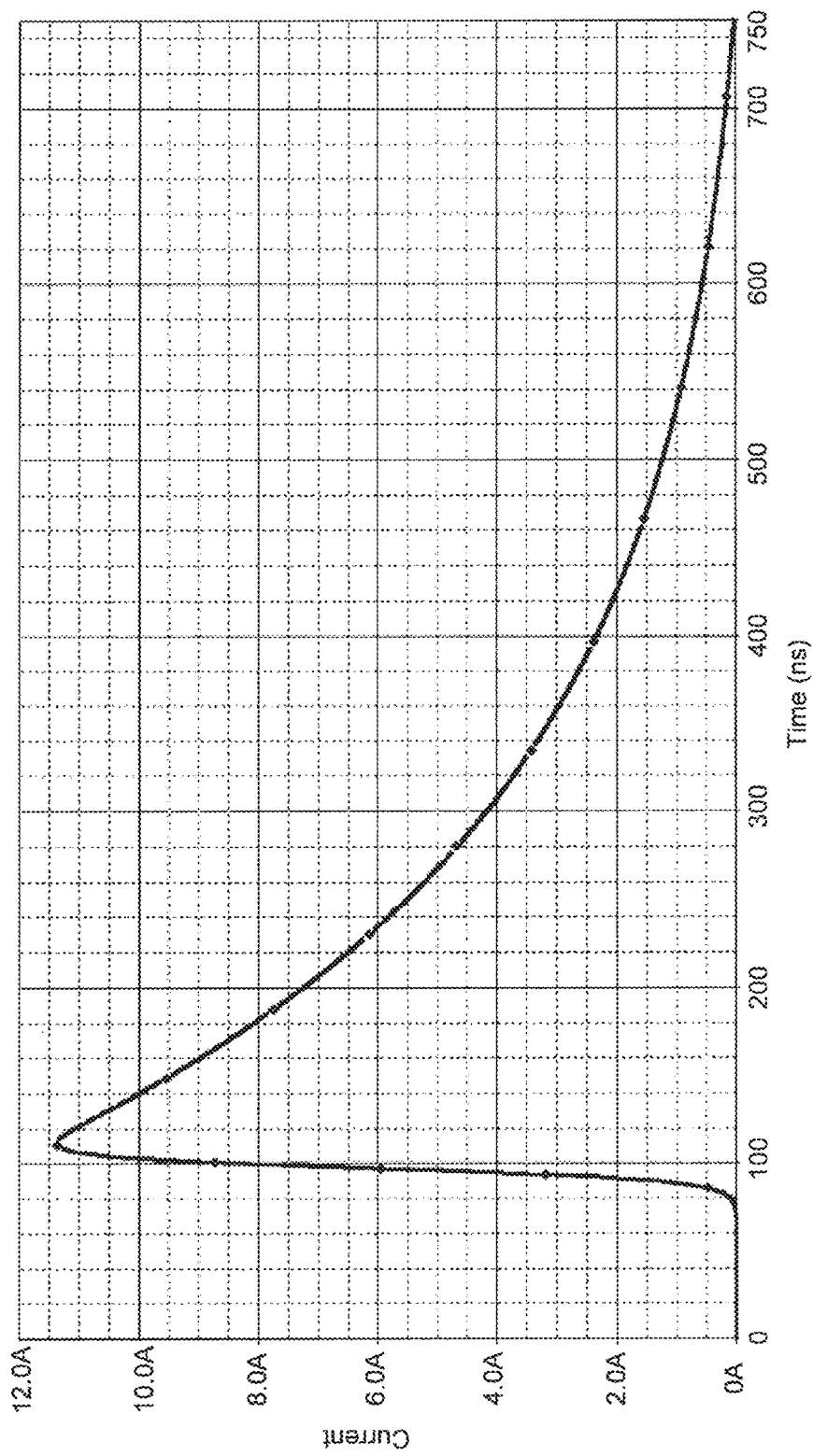
FIG. 7 is a diagram of a current waveform for the ESD protection network of FIG. 6 during an ESD event.

FIG. 7 illustrates a current waveform 195 for the capacitor 190 within the passive ESD protection network 150 illustrated in FIG. 6. When subjected to a 25 kV HBM ESD, the maximum current experienced by the capacitor 190 is 11 A. An 11 A current applied to a 10 nF capacitor may cause dielectric breakdown and permanently damage both the capacitor 190 and the passive ESD protection network.

Figure 8:
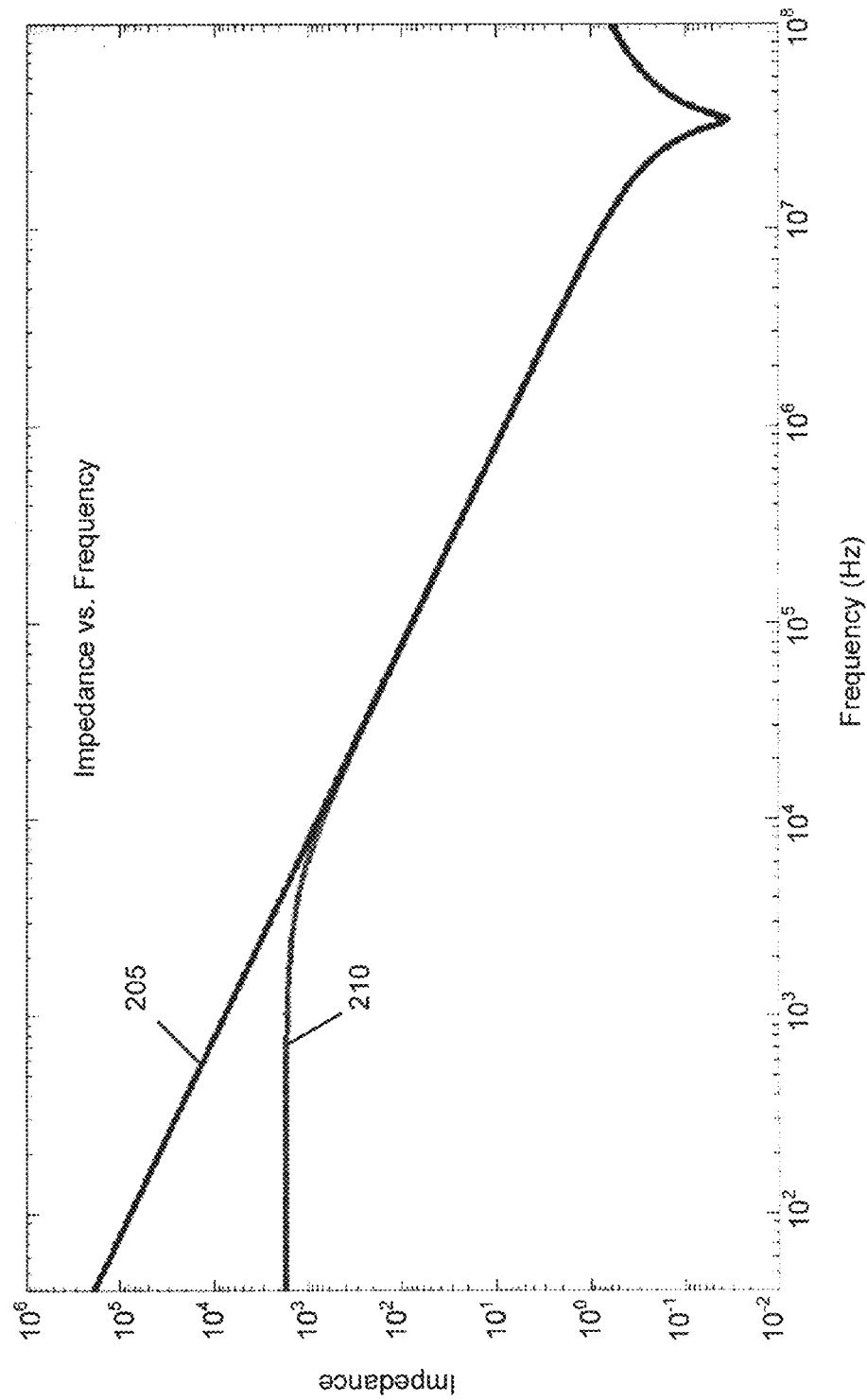
FIG. 8 is a diagram of an impedance-frequency response for the ESD protection network of FIG. 6 before and after an ESD event.

The effects of dielectric breakdown on the capacitor 190 within the ESD protection network are illustrated by the impedance-frequency response 200 of FIG. 8. The pre-ESD event impedance-frequency response 205 is relatively linear from 40 Hz to frequencies in the Megahertz range. The post-ESD event impedance-frequency response 210 is abnormal from 40 Hz up to approximately 10 kHz. As shown in the figure, the capacitor 190 experiences permanent dielectric damage due to the single 25 kV ESD event.

The reader should bear in mind that the relationship illustrated in FIG. 8 is, for descriptive purposes, plotted on a logarithmic scale. The actual relationship between capacitor impedance and frequency from DC up to approximately 50 MHz (the capacitor's self-resonance frequency) is given below:

$$Z = \frac{1}{2*\pi*f*C}$$

Therefore, the capacitor impedance ("Z") and frequency ("f") are inversely proportional. A logarithmic function is applied to the above equation (as demonstrated below) to produce the relationship illustrated in FIG. 8.

$$(\log(Z)) = -(\log(2*\pi*f*C))$$

Figure 9:
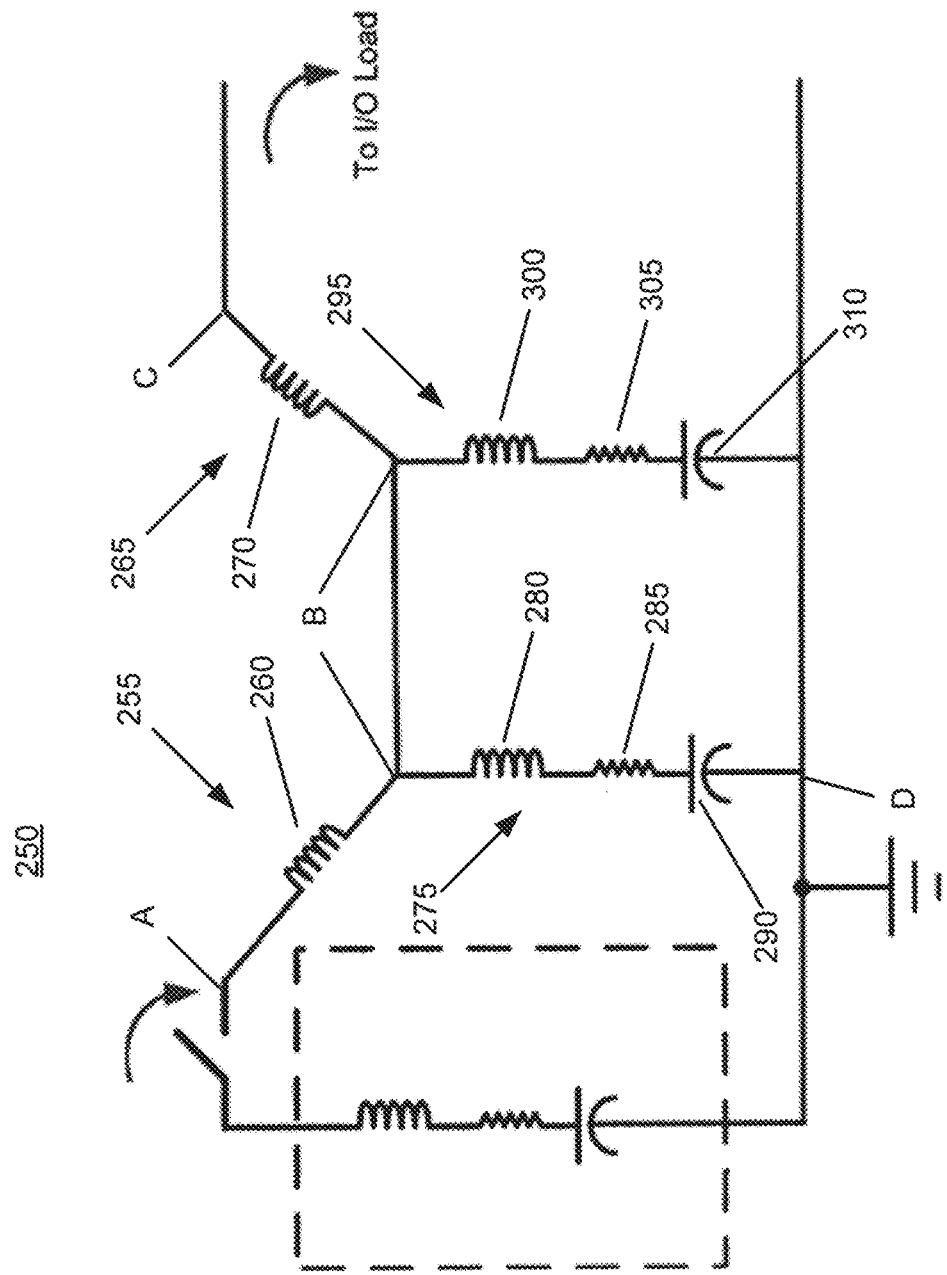
FIG. 9 is a diagram of a Y-connected dual branch passive ESD protection network according to an embodiment of the invention.

FIG. 9 illustrates an optimized dual branch passive ESD protection network 250. The network 250 includes nodes A, B, C, and D. Node C is connected to a pin or terminal of an integrated circuit, and node D is connected to a terminal of an automobile power supply (e.g., the negative terminal of the automobile power supply). A first circuit branch 255 between nodes A and B has a first inductance 260, and a second circuit branch 265 between nodes B and C has a second inductance 270. The first inductance 260 and the second inductance 270 have approximate values of, for example, 3 nH. A third circuit branch 275 has a third inductance 280, a first resistance 285, and includes a first capacitive circuit component 290 with a value of, for example, 4.7 nF. The first resistance 285 is shown as a parasitic equivalent resistance or resistive circuit component and has a value of approximately 100 m'Ω. The third inductance 280 is a shown as a parasitic equivalent inductance or inductive circuit component and has a value of approximately 800 pH. A fourth circuit branch 295 is similar to the third circuit branch 275 and has a fourth inductance 300 and a second resistance 305. The fourth circuit branch 295 also includes a second capacitive circuit component 310.

The third and fourth branches 275 and 295 are arranged in a parallel configuration between nodes B and D. In some embodiments the first and second capacitive components 290 and 310 have the same or approximately the same value. For example, the dual branch passive ESD protection network 250 includes two surface mount technology ("SMT") multi-layer ceramic capacitors ("MLCCs"), such as, for example, 4.7 nF capacitors that sum (when in parallel) to provide an equivalent capacitance of 9.4 nF (approximately the same capacitance as the single capacitor embodiment of FIG. 6). The use of high density connector pins in vehicle ECUs limits the mounting strategies available for the ESD protection network 250. As such, low-valued capacitors in small package styles (e.g., 0603 and 0402 packages) are used with the high density connectors. In other embodiments of the invention, different types, sizes, and values of capacitors can be used.

Similar to the configuration of FIG. 6, the ESD protection network 250 is arranged in a Y-connection such that the interconnect inductance due to high frequency ESD signals is minimized. For example, one end of the first circuit branch 255, one end of the second circuit branch 265, one end of the third circuit branch 275, and one end of the fourth circuit branch 295 are connected at node B. The dual branch passive ESD protection network 250 divides the ESD current between the third circuit branch 275 and the fourth circuit branch 295.

As an illustrative example, an ESD event that produces a discharge voltage of 25 kV (as modeled in FIG. 4) generates a peak current of 11 A, as described above. However, the discharge current from the ESD event is evenly divided between the third and fourth branches 275 and 295 of the passive ESD protection network 250.

Figure 10:
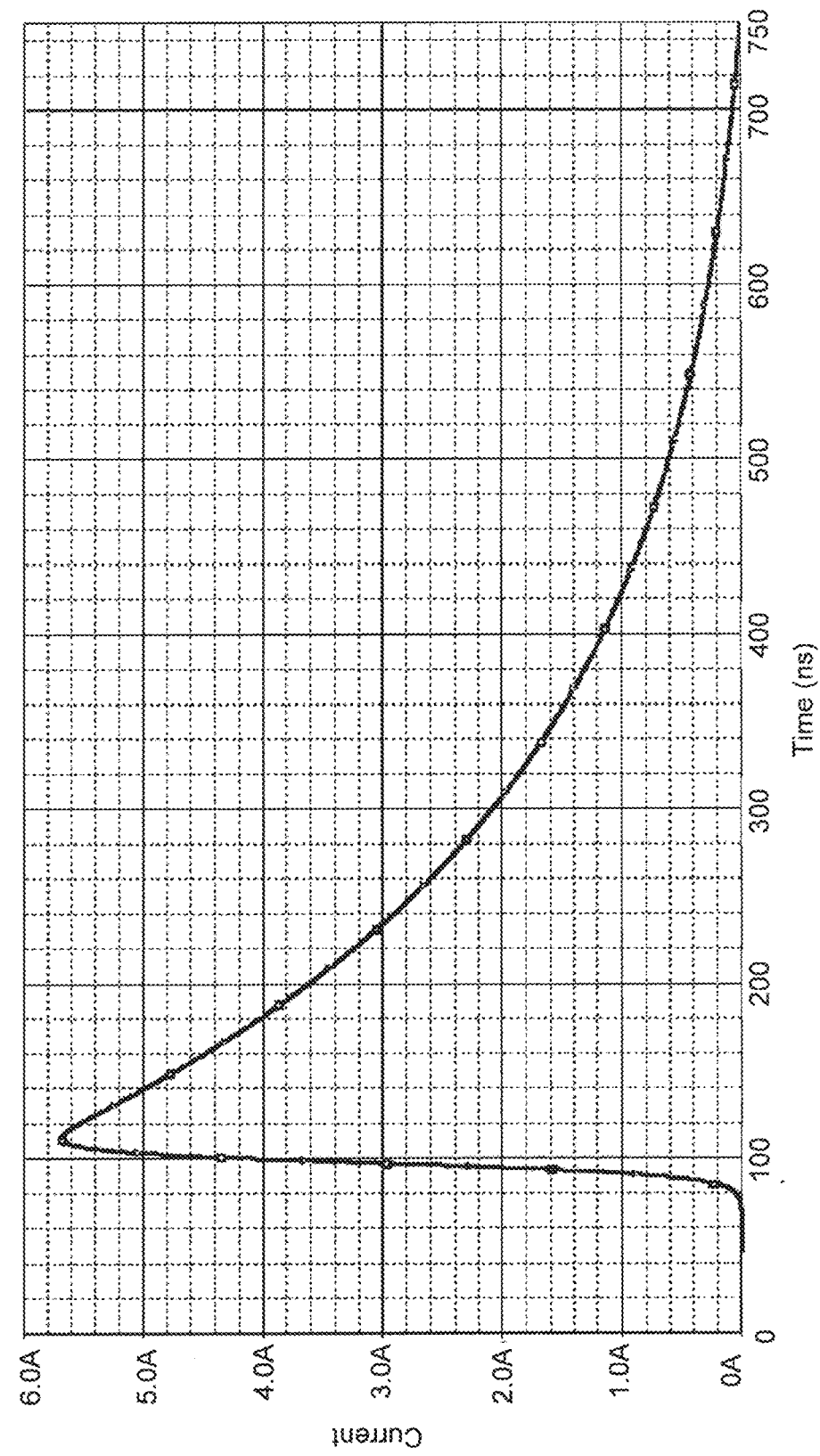
FIG. 10 is a diagram of a current waveform for one branch of the ESD protection network of FIG. 9 during an ESD event.

FIG. 10 illustrates a current waveform 315 for one of the branches within the dual branch passive ESD protection network 250 of FIG. 9. When subjected to a 25 kV HBM ESD, the maximum current experienced by each branch is approximately 5.5 A. A 5.5 A current applied to a 4.7 nF capacitor is not sufficient to cause dielectric breakdown or render the passive ESD protection network 250 inoperable.

FIG. 11 illustrates the pre-ESD and post-ESD event impedance-frequency responses 355 and 360, respectively, for the two 4.7 nF capacitors in the dual branch passive ESD protection network 250. The post-ESD event impedance-frequency response 360 for the two branches is approximately equal to the pre-ESD event impedance-frequency response 355. There are no significant differences between the pre-ESD and post-ESD event impendence frequency responses 355 and 360, respectively, from DC to the Megahertz frequency range. Therefore, when the capacitors are subjected to an ESD event, the dual branch passive ESD protection network 250 maintains its pre-ESD event impedance characteristics. The dual branch passive ESD protection network described above is therefore capable of repeated exposure to ESD events without experiencing the damage or destruction experienced by other ESD protection networks.

Thus, the invention provides, among other things, an electrostatic discharge ("ESD") protection circuit coupled between an I/O terminal of an electronic control unit ("ECU") and a terminal of a zero-voltage reference level. The circuit is configured to reduce the impedance of an ESD current path from the I/O terminal to the zero-voltage reference level to divert current away from the ECU during an ESD event. The network is capable of protecting an electronic device from multiple ESD events. Various features and advantages of the invention are set forth in the following claims.

What is claimed is:

1. A network for electrostatic discharge protection of an integrated circuit that includes at least one terminal, the network comprising:
   a first circuit branch including a first capacitive component, a first resistive component, and a first inductive component;
   a second circuit branch including a second capacitive component, a second resistive component, and a second inductive component, wherein a first end of the first circuit branch and a first end of the second circuit branch are connected to a first node;

a third circuit branch having a third inductive component; and a fourth circuit branch having a fourth inductive component, wherein a first end of the third circuit branch and a first end of the fourth circuit branch are connected to the first node, and wherein the network is configured to provide a low impedance path from the at least one terminal of the integrated circuit to a terminal of an automobile power supply during an electrostatic discharge event.

2. The network of claim 1, wherein the first circuit branch and the second circuit branch are connected in a parallel configuration.

3. The network of claim 1, wherein the first and second capacitive components are multi-layer ceramic capacitors.

4. The network of claim 1, wherein the first and second capacitive components are surface mount capacitors.

5. The network of claim 1, wherein the network is configured to withstand an electrostatic discharge current of at least nineteen amperes.

6. The network of claim 1, wherein the terminal of the automobile power supply is a ground.

7. A passive electrical network for electrostatic protection of an integrated circuit that includes at least one terminal, the network comprising:

a first circuit branch having a first reactance and positioned between a first node and a second node;

a second circuit branch having a second reactance and positioned between the second node and a third node; and a third circuit branch including a first reactive circuit component, a first resistive circuit component, and a first inductive circuit component positioned between the second node and a fourth node;

wherein the fourth node is connected to a terminal of an automobile power supply, and wherein the third node is connected to the at least one terminal of the integrated circuit.

8. The network of claim 7, wherein the first circuit branch, the second circuit branch, and the third circuit branch are connected in a Y-configuration.

9. The network of claim 7, wherein the first reactive circuit component is a capacitor.

10. The network of claim 9, wherein the capacitor is a multi-layer ceramic capacitor.

11. The network of claim 7, further comprising a fourth circuit branch including a second reactive circuit component and positioned between the second node and the fourth node.

12. The network of claim 11, wherein the second reactive circuit component is a capacitor.

13. The network of claim 11, wherein the network is configured to withstand an electrostatic discharge current of at least nineteen amperes.

14. The network of claim 7, wherein the terminal of the automobile power supply is a zero-voltage reference level.

15. A method of protecting an integrated circuit that includes at least one terminal from an electrostatic discharge event, the method comprising:

connecting, in a first circuit branch having a first resistive component and a first inductive component, a first capacitive component;

connecting, in a second circuit branch having a second resistive component and a second inductive component, a second capacitive component, wherein a first end of the first circuit branch and a first end of the second circuit branch are connected to a first node;

connecting a first end of a third circuit branch having a third inductance inductive component to the first node; and connecting a first end of a fourth circuit branch having a fourth inductance inductive component to the first node, wherein a second end of the fourth circuit branch is connected to the at least one terminal of the integrated circuit, and wherein the first circuit branch and the second circuit branch provide a low impedance path from the at least one terminal of the integrated circuit to a terminal of an automobile power supply during the electrostatic discharge event.

16. The method of claim 15, wherein the first circuit branch and the second circuit branch are connected in a parallel configuration.

17. The method of claim 15, wherein the first and second capacitive components are multi-layer ceramic capacitors.

18. The method of claim 15, wherein the first and second capacitive components are surface mount capacitors.

19. The method of claim 15, wherein the electrostatic discharge event produces a current of at least nineteen amperes.

20. The method of claim 15, wherein the terminal of the automobile power supply is a zero-voltage reference level.

* * * * *